April 6, 1926.
J. G. CHALMERS
1,579,914
VALVE CONTROL IN WATER COOLED GRINDERS
Filed Nov. 29, 1924   2 Sheets-Sheet 1
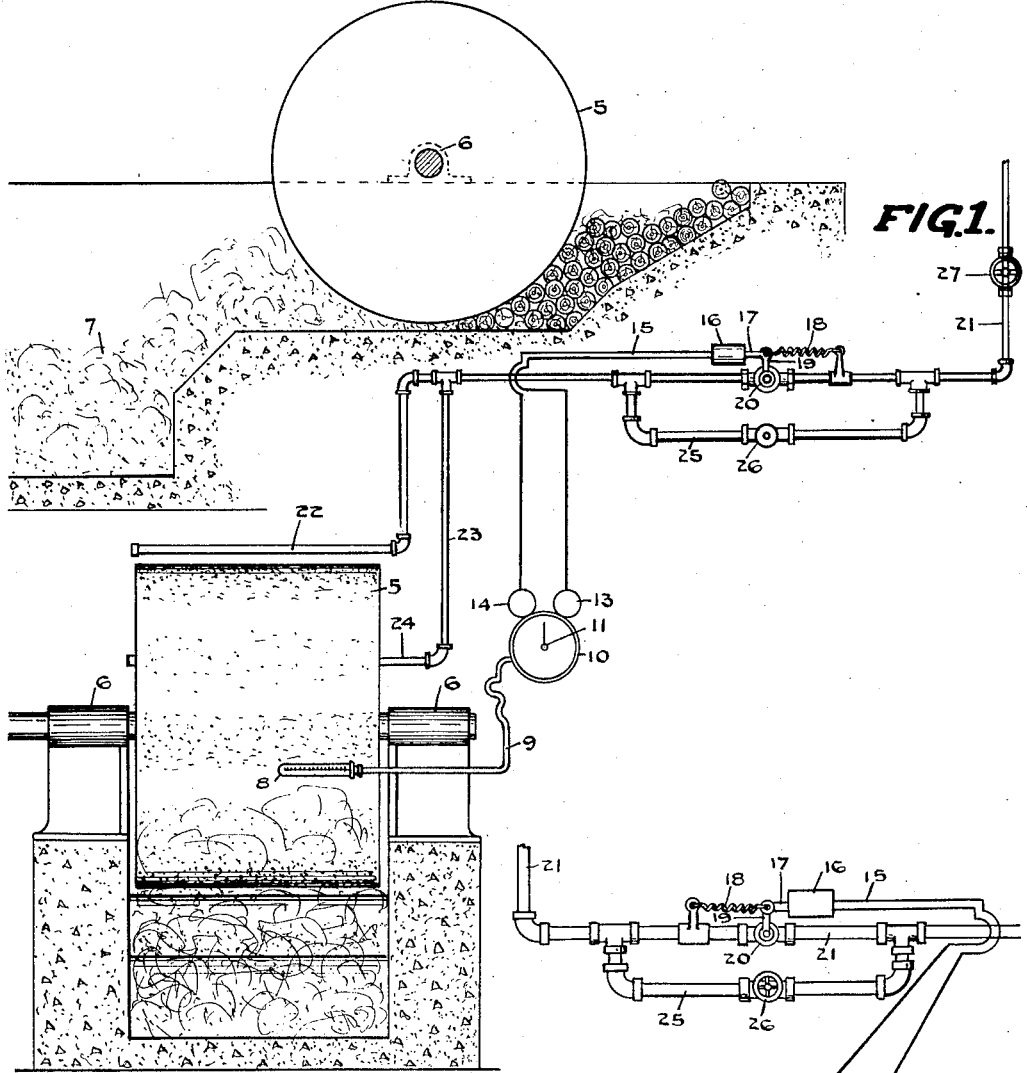
FIG.1.
FIG.2.
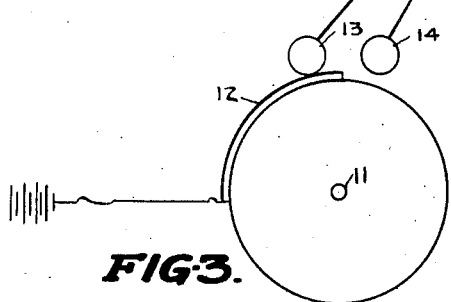
FIG.3.
INVENTOR.
J. G. Chalmers.
by E. J. Fetherstonhaugh
ATTORNEY April 6, 1926. 1,579,914
J. G. CHALMERS
VALVE CONTROL IN WATER COOLED GRINDERS
Filed Nov. 29, 1924 2 Sheets-Sheet 2
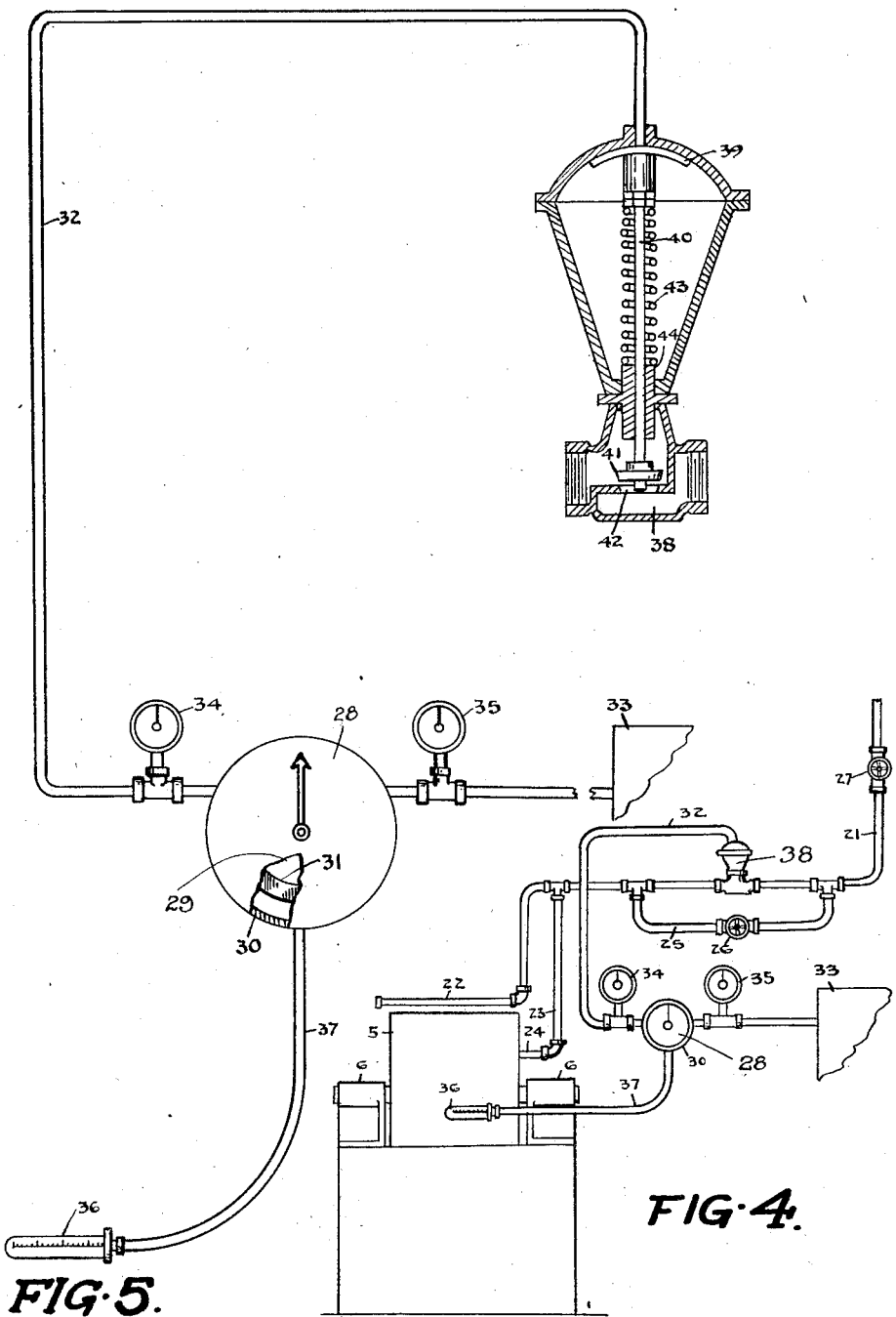
FIG·5. FIG·4.
INVENTOR
J. G. Chalmers.
by E. J. Fetherstonhaugh
ATTORNEY Patented Apr. 6, 1926.

1,579,914

UNITED STATES PATENT OFFICE.

JAMES GORDON CHALMERS, OF BATHURST, NEW BRUNSWICK, CANADA, ASSIGNOR TO BATHURST COMPANY LIMITED, OF BATHURST, CANADA.

VALVE CONTROL IN WATER-COOLED GRINDERS.

Application filed November 29, 1924. Serial No. 752,990.

*To all whom it may concern:*

Be it known that I, JAMES GORDON CHALMERS, a subject of the King of Great Britain, and residing at Bathurst, in the Province of New Brunswick, in the Dominion of Canada, have invented a new and useful Valve Control in Water-Cooled Grinders, of which the following is the specification.

The invention relates to valve control in water cooled grinders, as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to maintain grinding stones at a safe temperature and thereby avoid the cracking or breaking of the stones due to sudden variations during the grinding operations; to eliminate the necessity of constant attention to the cooling means thus insuring greater efficiency in regard to evenness of temperatures, particularly in the process of grinding wood for the manufacture of pulp; to effect the control by means of a simple mechanism economical in respect to the construction and reliable in its actions; and generally to provide an effective automatic means that will facilitate the carrying out of all kinds of grinding operations and increase the output and improve the product as well as reduce the cost of equipment.

In the drawings, Figure 1 is a side elevational view showing a grindstone as installed for the grinding of wood, and the application of the invention thereof.

Figure 2 is a front elevational view of the device illustrated in Figure 1, showing the invention applied thereto.

Figure 3 is a detail of the valve control mechanism.

Figure 4 is a diagrammatic view showing the invention as operated by compressed air.

Figure 5 is a sectional detail of the regular air valve mechanism.

Like numerals of reference indicate corresponding parts in the various figures.

Referring to the drawings, the grindstone 5 is shown as mounted in the bearings 6 and may be taken as suitably driven and mounted to grind the wood and bring it out in ground form as indicated at 7.

The temperature of the product 7 will give quite sufficient indication of the temperature of the stone to enable this invention to be operated successfully, therefore the thermostat bulb 8 is supported in the midst of said product and adjacent to the stone and this bulb 8 is connected by the tube 9 to the dial indicator 10 having a rotatable shaft 11, to which the switch contact 12 is secured.

The rise of the mercury in the tube 9 operates the indicator, which is common practice, and turns the indicator shaft thereby carrying the contact 12 therewith in rotation and connecting the contacts 13 and 14 to close the solenoid circuit 15.

The solenoid 16 in the circuit 15 has a core 17 held to its extreme outer position by the spring 18 and pivotally secured to the crank lever 19 mounted on the valve stem 20.

The valve stem 20 extends from a cut off valve in the water pipe line 21 leading from a water supply to a spout 22 directly over the stone 5 and by a branch line of pipe 23 to a spout 24 at the back of the stone though directed thereon. The spouts 22 and 24 direct the water completely over the stone, so that it will be cooled from end to end.

The by-pass 25 is a line of pipe leading around the valve operated by the stem 20 and the valve 26 is introduced in this by-pass.

A main valve 27 cuts off the supply entirely during the period that the grinder is not in use.

In the operation of the machine, the grindstone is rotated and the wood ground thereby and this heats both stone and product. At a predetermined temperature the contact closes the electric circuit governing the energization of the solenoid and the core is drawn in against the outward spring pull and in being drawn in the valve stem 20 is operated and this opens the valve and permits the flow of cooling water over the stone, which is not hot enough to crack or split from the sudden contact of cold water.

In Figures 4 and 5 the air valve 28 is operated by the movement of the diaphragm 29, which is arranged in the regulator casing 30 and adjusted by the cam 31 as to temperature expansion of air within said regulator. The valve 28 which is of the conventional form of thermostatically operated valves is situated in the air pipe line 32 from the compressed air tank 33 and the pressure on either side of the valve is gauged by the indicators 34 and 35 respectively. The thermostatic bulb 36 is connected by the flexible capillary tube 37 to the regulator 30, and as this bulb is in the ground wood in front of the stone the temperature of the latter is readily found and when too warm the expansion within the regulator 30 opens the air valve 28 and thus the compressed air flows from the compressor through to the inlet of the water valve casing 38, which is normally closed by the diaphragm 39 mounted at the upper end of the valve stem 40 having the valve 41 at the other end closing the water port 42 this valve being held by the spring 43 encircling the stem 40 between the fixed stop 44 and the head of the valve stem.

The operation of this form is quite similar as the air valve allows the air to impinge the diaphragm 39 and this operates the valve 41 and the resulting flow of water cools the grindstone.

What I claim is:—

1. A valve control in water cooled grinders comprising a thermostat submerged in the ground wood, a grindstone operating in a grinding pit, a sprinkler connected to a water supply and extending over said grindstone, a valve in said connections and normally shutting off the water supply, means for operating the valve and means affected by the thermostat for bringing the aforesaid operating means into action to open the aforesaid valve and coincidently lower the temperature of product and stone.

2. A valve control in water cooled grinders comprising a thermostat submerged in the ground wood, a grindstone operating in a grinding pit, a sprinkler extending over said grindstone and having a feed water pipe and an air connecting valve in said feed pipe for shutting off the water supply, an air feed pipe to said valve, a valve in said air feed pipe and a tubular connector connecting said submerged thermostat to said air valve.

3. A valve control in water cooled grinders comprising a thermostat submerged in the ground wood, a grindstone operating in a grinding pit, a sprinkler extending over said grindstone and having a feed water pipe and an air connecting valve in said air feed pipe, a by pass having a manually operating valve around said air controlled valve, an air feed pipe to said valve, a valve in said air feed pipe and a tubular connector connecting said submerged thermostat to said air valve.

Signed at Bathurst, N. B., this 3rd day of November 1924.

JAMES GORDON CHALMERS.